3,251,765
SEPARATION PROCESSES
Roger Templeton Lewis Mowll, Sunbury-on-Thames, England, assignor to The British Petroleum Company Limited, London, England, a British joint-stock corporation
No Drawing. Filed Feb. 6, 1963, Ser. No. 256,514
Claims priority, application Great Britain, Feb. 23, 1962, 7,145/62
12 Claims. (Cl. 208—310)

This invention relates to processes for the separation of hydrocarbon mixtures using molecular sieves.

It is well known that certain natural and synthetic zeolites have the property of preferentially absorbing certain types of hydrocarbons. These zeolites, known as molecular sieves, have crystalline structures containing a large number of pores of uniform size. In different zeolites these pores may vary from 4 A. to 15 A. or more in diameter, but in any one zeolite the pores will be of substantially uniform size.

It has previously been proposed to treat hydrocarbon mixtures with molecular sieves. It has been proposed to treat petroleum fractions ranging from gasoline to gas-oils and higher with molecular sieves having pore diameters ranging from 4 A. to 15 A. In order to separate straight-chain hydrocarbons from branched-chain and/or cyclic hydrocarbons a molecular sieve having pore diameters of 5 A. is suitable. Such a process may be used to recover a denormalised fraction, for example gasoline of higher octane number due to the removal of low octane normal paraffins. The absorbed straight-chain material may also be recovered if desired.

Conventional processes for treating hydrocarbon mixtures with molecular sieves comprise successive absorption and desorption stages, with or without an intervening purge stage. In such a conventional process the feedstock is contacted with the sieve, the absorbable components of the feedstock being absorbed while the non-absorbable components pass out as effluent. Material held in the voids between sieve particles and on the surface of the sieve is preferably purged using a suitable purging medium, for example nitrogen. The absorbed components are then recovered in a desorption stage either by suitably altering the process conditions, for example increasing the temperature and/or reducing the pressure, or by eluting with a suitable desorbing medium.

According to the present invention, a process for the separation of absorbable hydrocarbon components from their mixtures with non-absorbable components comprises successively contacting the mixture in a first stage with a molecular sieve to absorb the absorbable components, purging the reaction zone with a suitable medium in a second stage to remove interstitially and surface-held material and repeating the cycle, while recovering from the absorption stage an effluent richer in absorbable components than the feedstock and recovering from the purge stage an effluent richer in non-absorbable components than the feedstock.

The process is particularly suitable for treating petroleum fractions. Preferred feedstocks are those boiling in the gasoline and kerosine ranges, i.e. up to 280° C. Such a process may be used for the separation of straight-chain hydrocarbons from petroleum fractions using a 5 A. molecular sieve.

The process is preferably isobarically and isothermally operated, preferably in the vapour phase. Suitable conditions include temperatures within the range 100–400° C. preferably 350–390° C. and pressures within the range 0–500 p.s.i.g. preferably 100–150 p.s.i.g. Suitable purging media include hydrocarbons having from 1 to 6 carbon atoms in the molecule, for example n-pentane, and inert gases, preferably nitrogen. A diluent may also be fed with the feedstock to the absorption stage. Suitable diluents include any of the purging materials mentions above, nitrogen being preferred. The purging medium may be fed to the purging stage in either the same or the opposite direction to the feed in the preceding absorption stage, but the feed to the absorption stage is desirably introduced in the same direction as the purging medium in the preceding purge stage.

It has been found that, on discontinuing the purge stage and reintroducing feedstock to the sieve bed, the effluent initially withdrawn from the bed contains a greater proportion of absorbable components than the feedstock. After a time, however, the non-absorbable components appear in this effluent in increasing quantity. Preferably, therefore, the period of operation of the absorption stage is adjusted so that the switch to purging takes place before the non-absorbable components appear in the effluent from the absorption stage to an undesired extent. This extent will depend on a number of considerations including, for example, the nature of the feedstock and the type of product required. The effluent from the purging stage largely comprises non-absorbable components.

While the reason for the appearance of an effluent initially comprising predominantly absorbable components is not known with certainty, it is believed that during the purge stage, in which non-absorbable components are removed from the voids between sieve particles and the external surface of the sieve, equilibrium considerations, possibly assisted by the flow of purging medium during the purge stage, induce some of the absorbable components to leave the sieve pores and to be adsorbed on the external surface of the sieve or in the voids between sieve particles further along the bed. On recommencing the flow of feedstock it is believed that a "front" of advancing non-absorbed components displaces the absorbable components now adsorbed on the external surface of the sieve and filling the voids between sieve particles.

The invention is illustrated by the following examples:

*Example 1*

A kerosine fraction of Middle East origin boiling between 185° and 260° C. and containing 28% weight of n-paraffins was contacted with a fixed bed of 2740 grams of 5 A. molecular sieve in accordance with the present invention and under the conditions set out in the following table:

| Stage | Agent | Temperature, °C. | Pressure, p.s.i.g. | Space Velocity | Period, mins. |
|---|---|---|---|---|---|
| Absorption | Kerosine, Nitrogen | 380 | 175 | 0.9 LHSV, 70 GHSV | 2 |
| Purge | Nitrogen | 380 | 175 | 70 GHSV | 5 |

The effluent from the absorption stage was recovered in a yield of 2.1% sieve weight/hour and had a n-paraffin content of 70% weight i.e. 2½ times that of the feedstock. The effluent recovered from the purge stage contained 80% weight of non-straight-chain hydrocarbons.

Example 2

The feedstock of Example 1 was treated with a fixed bed of 2740 grams of 5 A. molecular sieve under the following conditions:

| Stage | Agent | Temperature, °C. | Pressure, p.s.i.g. | Space Velocity | Period, mins. |
|---|---|---|---|---|---|
| Absorption | Kerosine / Nitrogen | 350 | 15 | 0.2 LHSV / 75 GHSV | 2 |
| Purge | Nitrogen / n-Pentane | 350 | 150 | 75 GHSV / 1.0 LHSV | 2 |

The effluent from the absorption stage was recovered in a yield of 1.4% sieve weight/hour and a n-paraffin purity of 91% weight.

Example 3

The feedstock of Examples 1 and 2 was treated as before under the following conditions:

| Stage | Agent | Temperature, °C. | Pressure, p.s.i.g. | Space Velocity | Period, mins. |
|---|---|---|---|---|---|
| Absorption | Kerosine / Nitrogen | 350 | 150 | 0.5 LHSV / 75 GHSV | 2 |
| Purge | Nitrogen / n-Pentane | 350 | 150 | 75 GHSV / 1.0 LHSV | 3½ |

The effluent from the absorption stage was recovered in a yield of 1.25% sieve weight/hour and a n-paraffin purity of 88% weight.

I claim:

1. A two-stage, cyclic process for separating absorbable hydrocarbon components from their mixtures with non-absorbable components comprising successively contacting the mixture in a first stage with a 5 A. molecular sieve to absorb the absorbable components, purging the reaction zone with a suitable medium in a second stage to remove interstitially and surface-held material and repeating the cycle, while recovering from the first absorption stage an effluent richer in absorbable components than the feedstock and recovering from the second purge stage an effluent richer in non-absorbable components than the feedstock, said process being operated iso-thermally and iso-barically at a temperature within the range 100–400° C. and at a pressure within the range 0–500 p.s.i.g.

2. A process as claimed in claim 1 for separating straight-chain hydrocarbons from petroleum fractions using a 5 A. molecular sieve.

3. A process as claimed in claim 2 for treating petroleum fractions boiling up to 280° C.

4. A process as claimed in claim 1 which is operated in the vapour phase.

5. A process as claimed in claim 1 wherein the temperature lies within the range 100–150° C. and the pressure within the range 100–150 p.s.i.g.

6. A process as claimed in claim 1 wherein the purging medium comprises a hydrocarbon having from 1 to 6 carbon atoms per molecule.

7. A process as claimed in claim 1 wherein the purging medium comprises an inert gas.

8. A process as claimed in claim 7 wherein the purging medium is nitrogen.

9. A process as claimed in claim 1 wherein a diluent is fed with the feedstock to the absorption stage.

10. A process as claimed in claim 9 wherein the diluent is the same material as that used as the purging medium.

11. A process as claimed in claim 1 wherein the purging medium is fed to the purging stage in the same direction as the feed to the preceding and succeeding absorption stage.

12. A process as claimed in claim 1 wherein the purging medium is fed to the purging stage in the opposite direction to the feed to the preceding absorption stage and the feed to the succeeding absorption stage is fed in the same direction as the preceding purging stage.

References Cited by the Examiner

UNITED STATES PATENTS

| | | | |
|---|---|---|---|
| 2,818,137 | 12/1957 | Richmond et al. | 260—676 |
| 2,952,630 | 9/1960 | Eggertson et al. | 208—310 |
| 2,963,519 | 12/1960 | Kasperik et al. | 260—676 |
| 3,054,838 | 9/1962 | Egan | 208—310 |

FOREIGN PATENTS 851,977  10/1960  Great Britain.

ALPHONSO D. SULLIVAN, *Primary Examiner.*
D. S. ABRAMS, *Assistant Examiner.*